United States Patent [19]

Sackis et al.

[11] 4,439,563

[45] Mar. 27, 1984

[54] WATER BASED CONCRETE CURE

[75] Inventors: John J. Sackis, Bartlett; Paul H. Anderson, Elgin, both of Ill.

[73] Assignee: W. R. Meadows, Inc., Elgin, Ill.

[21] Appl. No.: 421,851

[22] Filed: Sep. 23, 1982

[51] Int. Cl.³ .............................................. C08K 5/35
[52] U.S. Cl. .................................... 524/96; 524/475; 524/487; 524/489; 524/499; 524/798
[58] Field of Search ................ 524/96, 475, 487, 489, 524/499, 798

[56] References Cited

U.S. PATENT DOCUMENTS

| | | | |
|---|---|---|---|
| 4,070,316 | 1/1978 | Combs et al. | 524/487 |
| 4,096,103 | 6/1978 | Lakshmanan et al. | 524/499 |
| 4,243,568 | 1/1981 | Brown | 524/475 |
| 4,374,177 | 2/1983 | Hsu et al. | 524/487 |

*Primary Examiner*—Melvyn I. Marquis
*Attorney, Agent, or Firm*—Lee, Smith & Jager

[57] ABSTRACT

A concrete cure is provided which is totally water based and completely void of solvents. A moisture impermeable film is attained when the cure is applied to fresh concrete. The cure forms a barrier over the concrete allowing it to retain over 95% of the mixing water for a minimum of 72 hours when applied at the rate of 200 ft²/gallon (5m²/dm³). The concrete cure of the invention is a mixture of a hydrocarbon resin, emulsifying agents, paraffinic wax, and water. The cure may be provided in a clear or pigmented formulation. A method for making the concrete cure is also disclosed.

17 Claims, No Drawings

WATER BASED CONCRETE CURE

BACKGROUND AND SUMMARY OF THE INVENTION

The field of the invention relates to a concrete cure which forms a relatively water impermeable barrier to retard the loss of water from the concrete mix during the early hardening period.

Conventional concrete curing formulations comprise waxes and/or resins dissolved in modified solvents. While such cures successfully achieve prescribed water retardation specifications, problems with the solvents have created the need for a water based cure. Some of the inherent difficulties with solvent based cures include environmental and pollution concerns, clean-up for the contractor and flammability.

Latex based cures have also been used, but they fail to set up quickly enough to retard early moisture release from the concrete to the atmosphere. In this type cure, the latex is a liquid monomer that is dispersed in liquid and then polymerized.

Other cures have utilized resin solvents with water, but the water was the interior, or discontinuous, phase and did not provide a truly water based formulation wherein the water itself was the exterior, or continuous, phase.

A limitation in the atmospheric dispersion of resins has required that the melting point be near 100° C. because of the difficulty in achieving dispersion in water below its boiling point. Resins with lower melting points have been known to leave tacky films when dry.

Providing a water based cure is highly desirable because by being water reducible it allows the contractor an easy clean-up.

Environmental considerations are also a factor and it would be additionally beneficial to eliminate organic solvents to reduce pollution.

As found with other attempts employing resins, exposure to ultraviolet light can cause discoloration.

While existing solvent based cures satisfy moisture retention requirements, it has been difficult to provide a water based formulation meeting these specifications as well.

From an economic standpoint it would be desirable to eliminate the need for more costly solvents and utilize water at a much lower cost.

An added benefit to the use of a water based cure is that the flammability hazard, inherent with solvent based cures, can be eliminated.

Accordingly, it is a primary goal of the invention to provide a concrete cure that is totally water based and completely void of solvents.

An important object of the invention is to provide a resin/wax single phase dispersion that meets design criteria, which has not been made possible heretofore.

It is a further goal of the invention to provide a water based cure which can be applied to fresh concrete and retain over 95% of the mixing water for a minimum of 72 hours which applied at the rate of 200 ft$^2$/gallon (5 m$^2$/dm$^3$).

It is an allied objective of the invention to satisfy environmental protection needs by omitting the use of solvents.

It is further a goal of the invention to provide a water based concrete cure which has the correct viscosity to make it capable of being sprayed with conventional applicator nozzles.

It is a concomitant object of the invention to provide a cure which may be exposed to ultraviolet light without discoloration.

It is further an object of the invention to eliminate the hazards of flammability.

It is another object of the invention to provide a water based cure which may be provided in a clear or pigmented formulation which meets state and federal specifications.

The water based concrete cure of the invention satisfies these foregoing goals and needs. The cure may be summarized in one form as having a mixture of hydrocarbon resin, emulsifying agents, paraffinic wax, and a minimum water content of about 60% by weight to yield a sprayable viscosity.

A method for the preparation of a water based cure is provided which includes the steps of melting a hydrocarbon resin and paraffinic wax. The molten resin/wax is then dispersed in water with a suitable emulsifying agent. Additional water is subsequently added to reduce solids and achieve a desired viscosity. The system is then agitated to ensure thorough mixing. The cure may then be containerized for shipment or applied to concrete.

The invention further provides a method for the preparation of a pigmented cure in which a predispersed pigment is added to the emulsified resin/wax in water. The predispersion steps include first adding water to a vessel, followed by the addition of an emulsifying agent. Then, the pigment is added to the vessel and dispersed. A small amount of additional water may be added to this first vessel to reduce the viscosity and reach a desired pumpable consistency. The predispersed mixture is then pumped to a second vessel for mixing with the emulsified resin/wax and water to thereby provide a pigmented concrete cure.

DETAILED DESCRIPTION OF THE INVENTION

Unless otherwise stated hereinafter, quantities are expressed in percentages of the total weight of the cure formulations. The invention advantageously employs the membrane-forming properties of wax, such as found with paraffinic waxes, plus the water retention capabilities offered by resins, such as an aliphatic hydrocarbon. Proper dispersion in water is required. A single-phase resin/wax dispersion in water is achieved where water is the exterior or continuous phase. It has been determined that aliphatic hydrocarbon resins having melting points lower than 20° to 30° C. below the boiling point of water leave tacky films when applied. It has been found that PICCOPALE ® 100 Resins, sold by Hercules, Inc., may be effectively dispersed. ESCOREZ 1102 Resin, sold by Exxon Corp., is another aliphatic hydrocarbon resin suitable for use in practicing the present invention. Other suitable equivalents will be apparent to those skilled in the art. The mixture with paraffinic wax helps reduce the viscosity of the molten resin and gives more consistent moisture barrier properties when dispersed with the resin. Additionally, the paraffinic wax acts as a plasticizer.

In order to achieve emulsification of the resin/wax mixture, emulsifying agents are added. It has been discovered that anionic emulsifiers, composed of a volatile base and fatty acid, form a soap which effectively emulsifies the resin/wax mixture. The volatile base evaporates quickly so that the resin will not re-emulsify, which could lead to "washing away" the final cure when applied. Anionic emulsifiers are preferred. The anionic emulsifiers are superior for attaining excellent moisture retention properties of the final film.

It has been learned that a fatty acid, when mixed with a volatile base, such as morpholine, offers stable emulsifying characteristics along with forming a final film which effectively retards water from leaving freshly poured concrete. This is particularly important in the early stages of setting. Several examples of fatty acids suitable for practicing the invention are tall oil, oleic, behenic, palmitic, steric and linoleic.

To meet standard specifications, such as set forth in ASTM C 309-74, Standard Specification for LIQUID MEMBRANE-FORMING COMPOUNDS FOR CURING CONCRETE, the minimum resin/wax solids needed for the system has been discovered to be about 13%. Reducing the resin/wax solids further will cause the moisture loss of the cure to be greater than the specifications will allow. The wax portion of the formulation can be increased to include the whole resin/wax portion of the formulation and yet still meet this moisture retention specification. A 5:1 ratio of resin/wax, having 15% resin and 3% wax, has been found to offer optimum results.

A minimum percentage of fatty acid is needed as an emulsifier for the no-resin minimum formulation, i.e. 13% wax, 0% resin. It has been found that this minimum is about 0.75% of the formulation by weight. With less, insufficient soap is present to form a stable emulsion. This minimum percentage of fatty acid cannot however be used with resin/wax combinations because then, due to the presence of resin, the fatty acid also acts as a plasticizing oil in the emulsification process. Accordingly, for the optimum 5:1 resin/wax formulation the resin/wax is too viscous to form a suitable emulsion with only 0.75% fatty acid. For the optimum formulation of 15% resin and 3% wax, the fatty acid is provided in at least the proportion of 1.50% of the total weight.

A minimum of 0.21% morpholine, or equivalent volatile base, is needed to fulfill the stoichiometry of the soap produced by 0.75% fatty acid. However, the morpholine is a volatile substance which is introduced into the formulation while the resin/wax is in a molten state. For this reason, the morpholine tends to rapidly evaporate from the system, leaving insufficient morpholine to produce the needed percentage of soap. An excess should be added to allow for evaporation. As set forth hereinafter in Example 1, the optimum formulation comprises 0.70% morpholine.

A minimum percentage of water has to be present in order to form the proper emulsion. About 55% resin/wax solids, 10% emulsifiers and 35% water yield the minimum water and maximum resin/wax formulation. While forming the emulsion is possible, the inclusion of this high percentage of resin/wax may be cost prohibitive. Furthermore, this minimum water content renders the cure too viscous to be sprayed. Approximately 60% water, with about 30–35% resin/wax content, is required to reduce the viscosity to a sprayable consistency. Of course, the most useful viscosity for spraying is a subjective determination that will vary among contractors. This water content variance is considered to be within the range of from about 60% to about 85% by weight of final cure formulation. At greater than 85% water content the water retention properties of the cure are inadequate to meet accepted standards.

The following Example 1 expresses the proportions of the preferred constitutents in what is considered to be the optimum formulation for a clear concrete cure.

EXAMPLE 1

| Clear Emulsion Formulation (Optimum) | |
|---|---|
| Raw Material | Percent by Weight |
| Aliphatic Hydrocarbon Resin* | 15.00 |
| Paraffinic Wax** | 3.00 |
| Fatty Acid*** | 1.50 |
| Morpholine | 0.70 |
| Water | 79.80 |

*PICCOPALE ® 100, Hercules, Inc.
**LIGHT PLASTICRUDE, National Wax Co.
***Tall Oil Fatty Acid As stated above, the minimum resin/wax solids needed has been determined to be about 13%. The formulation for the minimum resin/wax solids is shown in the following Example.

EXAMPLE 2

| Clear Emulsion Formulation (Min. Resin/Wax) | |
|---|---|
| Raw Material | Percent by Weight |
| Aliphatic Hydrocarbon Resin | 10.83 |
| Paraffinic Wax | 2.17 |
| Fatty Acid | 1.50 |
| Morpholine | 0.70 |
| Water | 84.80 |

As noted, the wax portion of the cure may be increased to include the entire resin/wax portion of the formulation of Example 1. The following Example provides the constituent proportions for the optimum no-resin cure.

EXAMPLE 3

| Clear Emulsion Formulation (Optimum No-Resin) | |
|---|---|
| Raw Material | Percent by Weight |
| Pariffinic Wax | 18.00 |
| Fatty Acid | 1.50 |
| Morpholine | 0.70 |
| Water | 79.80 |

The following Example sets forth the minimum percentage of fatty acid which creates sufficient soap present to form a stable emulsion for the no-resin cure of Example 3.

EXAMPLE 4

| Clear Emulsion Formulation (Min. Fatty Acid, No-Resin) | |
|---|---|
| Raw Material | Percent by Weight |
| Paraffinic Wax | 18.00 |
| Fatty Acid | 0.75 |
| Morpholine | 0.70 |
| Water | 80.55 |

While the optimum percentage by weight for the resin/wax solids is about 18%, the resin/wax may be provided in the range of from about 13% to about the above-recited maximum of 55%. The resin portion may be provided in the range of from 0% to about 50%, with 15% offering optimal properties. In addition, for proper dispersion in water, the melting point of the resin should be in the range of from about 70° C., to about 105° C. The paraffinic wax may be provided in a range of from about 2% to about 55%, with the above-stated optimum of 3%. A fatty acid should be present from a minimum proportion by weight of 0.75% up to about 8.00%. The optimum, as in Example 1, has been found to be about 1.50%. The amount of morpholine necessary for use as a volatile base for the fatty acid is a minimum of 0.21%. The morpholine may be present in a range of from this minimum up to about 2.00%, and optimally is about 0.70%. As stated above, the minimum proportion of water to achieve emulsification is a minimum of about 35%, but in order to achieve a useful spraying viscosity the practicable minimum is about 60%. Accordingly, the range of proportions for the water present in the final compound is from about 60% to about 85%.

Titanium dioxide (TiO$_2$) is a well-known pigment useful for providing a conventionally prescribed uniform white appearance to concrete cures. Other pigments, such as calcium carbonate, are suitable for use. In order to provide a uniform appearance, when a white pigmented cure is specified, it has been learned that to achieve reflectance of approximately 60%, titanium dioxide (TiO$_2$) should be present in about 4.0% by weight. A minimum value has been determined to be about 3.5%.

The white pigment formulation for the water based cure of the invention involves a predispersion of the pigment, which is initially prepared for subsequent mixing with a clear emulsion concentrate and water, as will be described.

A predispersion of TiO$_2$ for mixing with the concentrated emulsion is provided by the optimum formulation set forth in the following Example.

EXAMPLE 5

| White Pigment Predispersion Formulation | |
| --- | --- |
| Raw Material | Percent by Weight |
| TiO$_2$ | 4.02 |
| Fatty Acid | 0.24 |
| Morpholine | 0.20 |
| Water | 7.04 |
| | 11.50 |

The optimum emulsion concentrate for mixing with the white pigmented formulation of Example 5 is provided in the following Example.

EXAMPLE 6

| Emulsion Concentrate for Mixing with Predispersed TiO$_2$ | |
| --- | --- |
| Raw Material | Percent by Weight |
| Aliphatic Hydrocarbon Resin | 15.00 |
| Paraffinic Wax | 3.00 |
| Fatty Acid | 1.50 |
| Morpholine | 0.70 |
| Water | 68.30 |
| | 88.50 |

Accordingly, the final white pigmented cure comprises the total combined proportions of Examples 5 and 6 and is expressed in the following Example.

EXAMPLE 7

| Final Cure Formulation with White Pigment | |
| --- | --- |
| Raw Material | Percent by Weight |
| TiO$_2$ | 4.02 |
| Aliphatic Hydrocarbon Resin | 15.00 |
| Paraffinic Wax | 3.00 |
| Fatty Acid | 1.74 |
| Morpholine | 0.90 |
| Water | 75.34 |
| | 100.00 |

The preparation of the water based concrete cure involves an initial dispersion of the resin and wax in water. The dispersion of resins in water is not effective for achieving emulsification at temperatures below the boiling point of water. A method has been found to effectively disperse and emulsify the resin/wax with an emulsifying agent, which results in a cure that successfully attains the necessary water retention characteristics. The method is described with first reference to the clear formulation of Example 1, and secondly to the pigmented formulation set forth in Examples 5-7. The steps are applicable for making cures within the ranges of proportions described above, as would be clear to one skilled in the art.

METHOD FOR MAKING CLEAR CURING COMPOUND OF EXAMPLE 1

The aliphatic hydrocarbon resin and paraffinic wax are placed in a heating vessel and heated to about 250° F. (121° C.) until melted. Next, the molten resin/wax is poured into a conventional disperser vessel means. The fatty acid is then introduced into the disperser vessel means and the temperature is equilibrated to maintain the 250° F. (121° C.) temperature. Then the volatile base, preferably morpholine, is added to the vessel. Disperser means is then activated to mix the emulsifying agents and resin/wax. Immediately after the disperser means is activated, preheated emulsifying water is added in the given percentage by weight of 9.72%. The emulsifying water is preheated to about 190° F. (88° C.) and is carefully introduced so as to prevent excessive boiling of the water.

The emulsifying agents form a soap and therefore dispersion should be effected without excessive agitation to avoid foaming. A concentrated dispersion is formed. Preheated thinning water in the given amount of 11.11% by weight is slowly added to make the system pumpable. The thinning water is also preheated to about 190° F. (88° C.). The dispersion concentrate is then pumped to a let down vessel means containing the remaining portion of water (58.97%). Lastly, the concentrate and let down water are agitated slowly for several minutes to ensure a thorough mixing. A sprayable viscosity is obtained and the cure is then ready for placement into containers for shipment, or may be applied to concrete.

The step of pumping the emulsion concentrate from the disperser vessel means to the let down vessel means is best accomplished by introducing the concentrate through an inlet at the bottom of the let down vessel means. This reduces agitation and splashing to prevent the emulsion from foaming.

In the foregoing description for the method of making the optimum formulation of Example 1, the proportions given for the emulsifying, thinning and let down waters have been found to provide satisfactory results within working limits. The specific values given are set forth for the purpose of exemplification but are not limited thereto. The emulsifying water can be added in the range of about 10.0%±1.00% by weight of the final cure for attaining emulsification. In this Example, thinning water added in the amount of 11.11% has been discovered to render the formulation pumpable, but this exemplary proportion is not intended as limiting the invention thereto. It will be appreciated that both pumpable and sprayable viscosities involve subjective determinations and are considered to be matters of choice. The remaining portion of the water content in the formulation, or the let down water, facilitates dilution of the concentrate to a useful viscosity for spray application to concrete. A range of viscosities, useful for spray application, can be achieved by variance of the final water proportion and/or adding aqueous thickeners to suit individual needs. The final water content of the cure may vary within the above-noted range of from about 60% to about 85% and offer a suitable viscosity with proper retention properties.

With respect to the formulations set forth in Examples 2–4, and for the stated ranges of proportions for formulations within the scope of the disclosed invention, a proration of the emulsifying and thinning water percentages given for the foregoing method, based on the percentage by weight of resin/wax solids, may be used to yield an effective cure.

Method For Making White Pigmented Cure of Examples 5–7

In making the white pigmented concrete cure of Examples 5–7 above, an initial predispersion of titanium dioxide is made (Example 5). Separately, an emulsion concentrate (Example 6) is prepared. The predispersion of titanium dioxide and the emulsion concentrate are introduced into the let down vessel means and mixed with water to form the final cure (Example 7).

The steps for making the white pigmented predispersion include adding dispersing water in the amount of 4.02% by weight of the ultimate formulation. This dispersing water is placed into a conventional dispersing vessel means. Then a volatile base, preferably morpholine, is added in the amount of 0.20% by weight to the dispersing vessel means. A disperser means is activated and fatty acid in the amount of 0.24% by weight is introduced to the dispersing vessel means. Titanium dioxide is added to the vessel in the amount of 4.02% by weight and is subjected to the disperser activation for about 2 to 3 minutes. Let down water in the amount of 3.02% is then added to the disperser vessel means to reduce viscosity. At this point the predispersion of titanium dioxide is ready for mixing with the emulsion concentrate. The predispersion of Example 5 of 11.5% by weight of the total cure formula of Example 7.

The emulsion concentrate is separately prepared in substantially the identical manner as the cure of Example 1, described above. Firstly, the aliphatic hydrocarbon resin and paraffinic wax are melted down together by heating to about 250° F. (121° C.) in proportions of 15.00% and 3.00% by weight respectively, as given in Example 6. The molten resin/wax is then placed into a conventional disperer vessel means. Fatty acid is introduced in the stated proportion of 1.50% by weight to the disperser vessel means containing the molten resin/wax. The temperature is equilibrated to 250° F. (121° C.). Then, morpholine is added to the disperser vessel means and disperser means is activated for mixing the emulsifying agents to effect emulsifying and plasticizing the resin/wax mixture. Thereafter, the preheated emulsifying water is added with care taken to prevent excessive boiling of the water. The dispersing action continues until the proper emulsion is formed. Next, the preheated thinning water is added slowly to the system to make the product pumpable. The ranges of variance for the emulsifying and thinning water percentages, as explained in the foregoing method for the preparation of the Example 1 cure, are applicable.

The titanium dioxide predispersion and emulsion concentrate are pumped to a let down vessel means and mixed therein with the remaining portion of water in the formulation, or the let down water. The system is agitated slowy for several minutes to ensure thorough mixing. The resulting white pigmented concrete cure is then ready to be placed into containers for shipment or may be applied to concrete.

It has been determined that in the preparation of the emulsion concentrate, the step of adding emulsifying water to the disperser vessel means is preferably achieved by adding emulsifying water to the molten resin/wax, rather than resin/wax to water. The slow addition of emulsifying water to the disperser vessel means aids greatly in achieving the proper dispersion.

ACHIEVEMENTS

The water based concrete cure disclosed offers a truly 100% water based cure wherein water is the continuous phase. The cure offers excellent moisture retention (low water loss). When spray-applied to freshly poured concrete, this water loss has been determined to be 0.015 g/cm$^2$ or less, for a period of 72 hours, which is significantly less than that required by the ASTM standard specification of 0.055 per g/cm$^2$ for 72 hours. This superior retention is achieved at the application rate of 200 ft$^2$/gallon (5m$^2$/dm$^3$), which is set forth in the standard specification in order to determine conformance to the specification. Accordingly, the economic benefit of greater coverage per gallon is made possible, while still meeting the water retention requirements for a cure media.

With the elimination of solvents, flammability no longer is a concern to the contractor. Environmental protection is further achieved to satisfy pollution control guidelines.

What is claimed is:

1. A method for making a water based concrete cure comprising the steps of:
   melting an aliphatic hydrocarbon resin having a melting point in the range of from about 70° C. to about 105° C., and a paraffinic wax having a combined weight by percentage of the final product of at least 13%;
   mixing into the resin and wax an emulsifying agent in an amount of at least 0.96% by weight;
   adding water sufficient to form an emulsion of resin and wax in the water.

2. The method as in claim 1 wherein the step of adding the emulsifying agent comprises the step of adding at least 0.75% by weight of a fatty acid and adding at least 0.21% by weight of volatile base into the disperser vessel means.

3. The method as in claim 2 including the step of adding the volatile base comprises adding morpholine.

4. The method as in claim 1 including the step of adding a predispersion of a white pigment to the let down vessel means.

5. A water based concrete cure comprising an aliphatic hydrocarbon resin and paraffinic wax, emulsified in from about 60% to about 85% water by weight, wherein the concrete cure forms a film when applied to freshly poured concrete and restricts the loss of water from the concrete to not more than 0.055 g/cm$^2$ for 72 hours.

6. The water based concrete cure as in claim 5 wherein the ratio of aliphatic hydrocarbon resin to paraffinic wax is about 5:1.

7. The water based concrete cure as in claim 6 wherein the resin has a melting point of from about 70° C. to about 105° C.

8. The water based concrete cure as in claim 5 wherein the emulsifying agents comprise a fatty acid and a volatile base.

9. The water based concrete cure as in claim 8 wherein the volatile base comprises morpholine.

10. The water based concrete cure as in claim 8 wherein the fatty acid is present in at least 0.75% by weight and the volatile base is present in at least 0.21% by weight.

11. The water based concrete cure as in claim 5 wherein the hydrocarbon resin and paraffinic wax are present in a combined weight of at least 13% by weight.

12. The water based concrete cure as in claim 5 wherein the cure has a sprayable viscosity.

13. The water based concrete cure as in claim 12 wherein the cure dries to a clear membrane-like film.

14. The water based concrete cure as in claim 5 wherein the cure comprises at least 3.5% by weight of white pigment.

15. The water based concrete cure as in claim 14 wherein the white pigment comprises titanium dioxide.

16. A water based concrete cure which comprises a mixture of from about 13% to about 35% by weight of a resin/wax with the wax being a paraffinic wax and the resin being an aliphatic hydrocarbon having a melting point in the range of from about 70° C. to about 105° C., at least 0.75% by weight of a fatty acid, at least 0.21% by weight of a volatile base, and from about 60% to about 85% by weight of water, whereby the cure is a sprayable liquid.

17. An emulsion concentrate of a water based concrete cure, capable of being mixed with additional water to attain a viscosity suitable for spray application onto freshly poured concrete, comprising:
   an aliphatic hydrocarbon resin having a melting point of about 70° C. to about 105° C.;
   a paraffinic wax capable of plasticizing the resin;
   anionic emulsifying agents comprising a fatty acid and volatile base; and emulsifying water;
wherein the emulsion concentrate is water based having water as the exterior, or continuous phase.

* * * * *

UNITED STATES PATENT AND TRADEMARK OFFICE
CERTIFICATE OF CORRECTION

PATENT NO. : 4,439,563

DATED : March 27, 1984

INVENTOR(S) : John J. Sackis, Paul H. Anderson

It is certified that error appears in the above—identified patent and that said Letters Patent are hereby corrected as shown below:

Column 7, Line 55, immediately preceding "11.5%" please delete the word "of" and substitute therefor --is--.

Signed and Sealed this

Nineteenth Day of February 1985

[SEAL]

Attest:

DONALD J. QUIGG

Attesting Officer    Acting Commissioner of Patents and Trademarks